(12) United States Patent
Sowards et al.

(10) Patent No.: US 8,613,681 B2
(45) Date of Patent: Dec. 24, 2013

(54) TRANSMISSION HYDRAULIC CONTROL SYSTEM HAVING CLUTCH COMPENSATOR FEED OVERRIDE

(75) Inventors: Michael D. Sowards, Novi, MI (US); Brian W. Whitmarsh, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1070 days.

(21) Appl. No.: 12/622,249

(22) Filed: Nov. 19, 2009

(65) Prior Publication Data

US 2011/0118080 A1    May 19, 2011

(51) Int. Cl.
 *F16H 31/00* (2006.01)
(52) U.S. Cl.
 USPC ............ 475/127; 475/116; 475/128; 475/158; 477/158
(58) Field of Classification Search
 USPC ................ 475/127, 116, 128, 158; 477/158
 See application file for complete search history.

(56) References Cited

U.S. PATENT DOCUMENTS

| | | | |
|---|---|---|---|
| 6,361,287 B1 | 3/2002 | Hopper | |
| 7,325,885 B2 | 2/2008 | Berger et al. | |
| 7,497,799 B2 | 3/2009 | Hagelskamp et al. | |
| 7,621,836 B2 | 11/2009 | Lim | |
| 8,069,661 B2 * | 12/2011 | Hendrickson et al. | 60/417 |

FOREIGN PATENT DOCUMENTS

| | | |
|---|---|---|
| DE | 2141564 A1 | 2/1973 |
| DE | 4320353 A1 | 1/1994 |
| DE | 19813982 A1 | 10/1999 |
| DE | 19857222 A1 | 6/2000 |
| DE | 10147123 A1 | 4/2002 |
| DE | 10327406 A1 | 2/2005 |
| DE | 102004001753 A1 | 8/2005 |
| DE | 102005006431 A1 | 8/2006 |
| EP | 0157086 A1 | 10/1985 |
| EP | 0475488 A1 | 3/1992 |
| EP | 0933564 A2 | 8/1999 |
| EP | 1420185 A1 | 5/2004 |
| WO | WO9705410 A1 | 2/1997 |

\* cited by examiner

*Primary Examiner* — Derek D Knight

(57) ABSTRACT

A hydraulic control system in a transmission includes a source of pressurized hydraulic fluid and a compensator valve in communication with the source of pressurized hydraulic fluid and a torque transmitting device. The compensator valve is operable to allow communication of the hydraulic fluid from the source of pressurized hydraulic fluid to the torque transmitting device to release the torque transmitting device. A regulation valve is in communication with the source of pressurized hydraulic fluid and the torque transmitting device. The regulation valve is moveable between a first position that prevents the hydraulic fluid from communicating with the torque transmitting device and a second position that allows the hydraulic fluid to communicate with the torque transmitting device to engage the torque transmitting device. An override feature is operable to prevent the compensator valve from communicating the hydraulic fluid to the torque transmitting device when the torque transmitting device is engaged.

17 Claims, 5 Drawing Sheets

TRANSMISSION HYDRAULIC CONTROL SYSTEM HAVING CLUTCH COMPENSATOR FEED OVERRIDE

FIELD

The present disclosure relates to a transmission hydraulic control system having a clutch compensator feed circuit override that disconnects the clutch compensator feed circuit from a supply circuit when clutch compensation is not required.

BACKGROUND

The statements in this section merely provide background information related to the present disclosure and may or may not constitute prior art.

A typical automatic transmission includes a hydraulic control system that is employed to actuate a plurality of torque transmitting devices as well as provide cooling and lubrication to the components of the transmission. These torque transmitting devices may be, for example, friction clutches and brakes. The conventional hydraulic control system typically includes a main pump that provides a pressurized fluid, such as oil, to a plurality of valves and solenoids within a valve body. The main pump can be driven by the engine of the motor vehicle or an auxiliary electric motor.

In order to actuate a given torque transmitting device, hydraulic fluid is directed through a clutch regulation valve to feed a clutch piston. The clutch piston translates the force of the hydraulic fluid acting on the piston into mechanical actuation within the torque transmitting device. In certain configurations, it is desirable to have a clutch compensator circuit that feeds hydraulic fluid to the opposite side of the clutch piston to initiate a rapid disengagement or release of the torque transmitting device and to balance the centrifugal effects of the rotating fluid. However, the compensator feed circuit requires additional line pressure from the main pump, which in turn reduces the efficiency of the transmission. While conventional hydraulic control systems are effective, there is room in the art for an improved hydraulic control circuit that increases the efficiency of a transmission having a clutch compensator feed circuit while minimizing complexity and maintaining clutch performance.

SUMMARY

A hydraulic control system in a transmission includes a source of pressurized hydraulic fluid and a compensator valve in communication with the source of pressurized hydraulic fluid and in communication with a torque transmitting device. The compensator valve is operable to allow communication of the hydraulic fluid from the source of pressurized hydraulic fluid to the torque transmitting device to aid in the release of the torque transmitting device and to balance the centrifugal effects of the rotating fluid. A regulation valve is in communication with the source of pressurized hydraulic fluid and in communication with the torque transmitting device. The regulation valve is moveable between a first position that prevents the hydraulic fluid from communicating with the torque transmitting device and a second position that allows the hydraulic fluid to communicate with the torque transmitting device to engage the torque transmitting device. An override feature is operable to prevent the compensator valve from communicating the hydraulic fluid to the compensator of the torque transmitting device (or the release side of the clutch) when the torque transmitting device is engaged.

In one example of the present invention, the override feature includes a solenoid multiplexed with both the compensator valve and the regulation valve.

In another example of the present invention, a three-way ball check valve is disposed between the compensator valve and the solenoid.

In yet another example of the present invention, the compensator valve is connected to the torque transmitting device through the regulation valve, and the regulation valve controls whether the hydraulic fluid from the compensator valve communicates with the torque transmitting device to release the torque transmitting device.

In yet another example of the present invention, the override feature includes a two-port solenoid that controls the position of the regulation valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
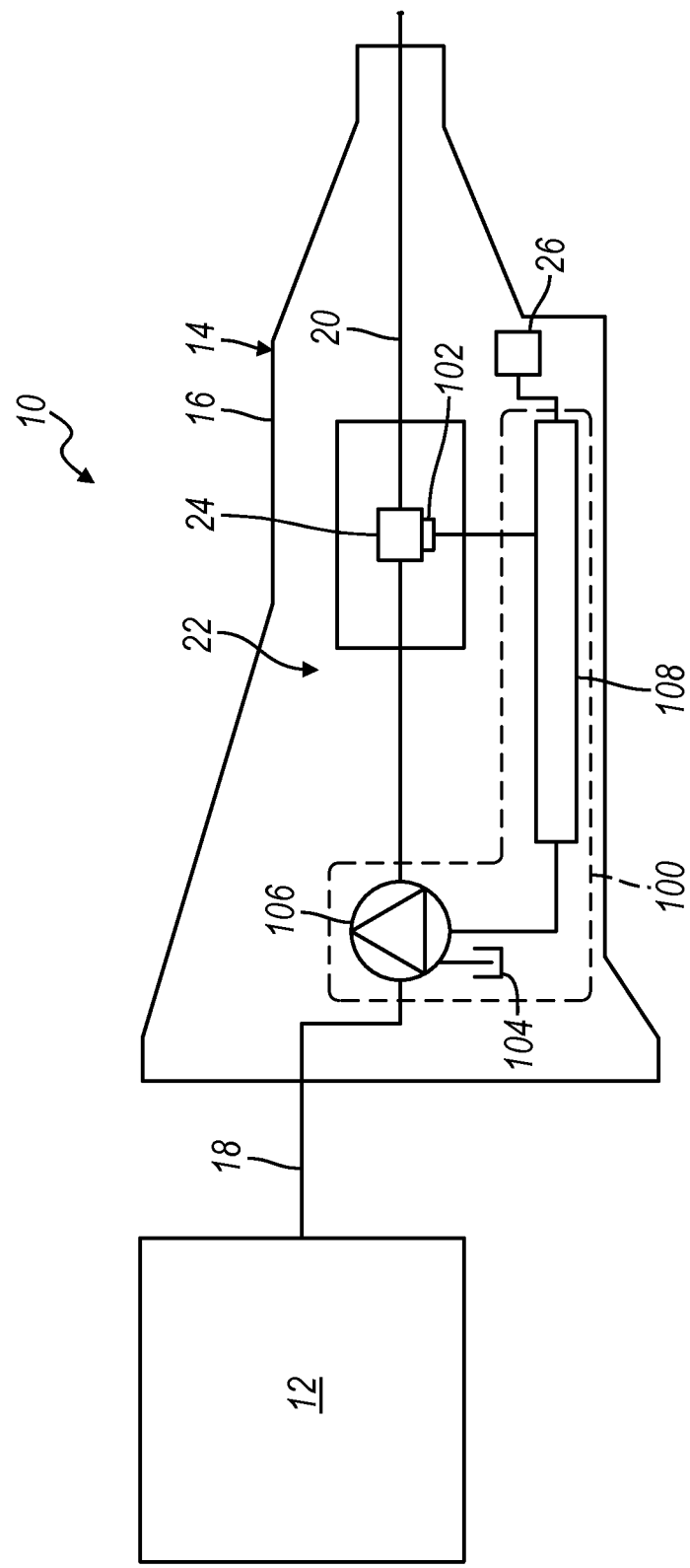
FIG. 1 is a schematic diagram of a powertrain having a hydraulic control system according to the principles of the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. If an electric engine, the engine 12 could be located within the transmission 14. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least one torque transmitting mechanism 24. In the example provided, the torque transmitting mechanism 24 is engageable to initiate a gear or speed ratio by selectively coupling individual gears within the plurality of gear sets to individual shafts within the plurality of shafts. Accordingly, the torque transmitting mechanism 24 may be any type of clutch, including wet clutches, rotating clutches, etc., without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanism 24 via a hydraulic control system 100 according to the principles of the present disclosure.

The hydraulic control system 100 is operable to selectively engage the torque transmitting device 24 by selectively communicating a hydraulic fluid to a shift actuating device 102 connected to the torque transmitting device 24, as will be described in greater detail below. The shift actuating device 102 may be a piston assembly or any other hydraulically actuatable mechanism operable to engage and disengage the torque transmitting device 24 without departing from the scope of the present disclosure. The shift actuating device 102 is moveable between an engaged position and a disengaged position. When in the engaged position, the shift actuating device 102 engages the torque transmitting device 24 thereby allowing the torque transmitting device 24 to transmit torque therethrough. When in the disengaged position, the shift actuating device 102 disengages the torque transmitting device 24 thereby prohibiting the torque transmitting device 24 to transmit torque therethrough. The hydraulic fluid used to actuate the shift actuating device 102 is communicated from a sump 104 under pressure via a pump 106 that is driven by the engine 12 or an auxiliary electric motor. The pump 106 may be of various types, for example, a gear pump, a vane pump, a gerotor pump, or any other positive displacement pump. A valve body 108 having a plurality of valves, solenoids, fluid channels, and other control devices selectively communicates the hydraulic fluid from the pump 106 to the shift actuating device 102 in order to engage or disengage the torque transmitting device 24.

Figure 2A:
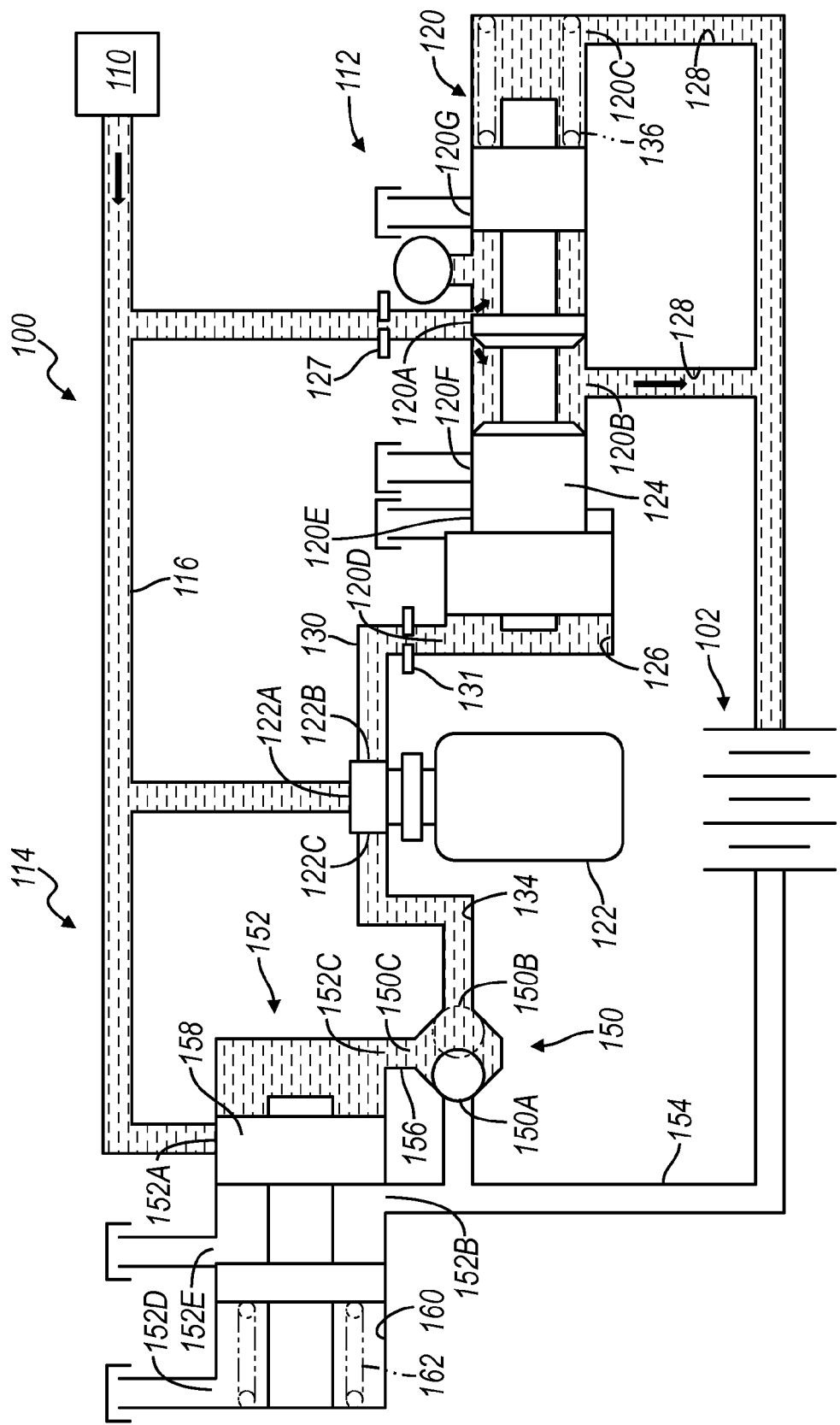
FIG. 2A is a diagram of an example of a hydraulic control system according to the principles of the present disclosure in first mode of operation.
Figure 2B:
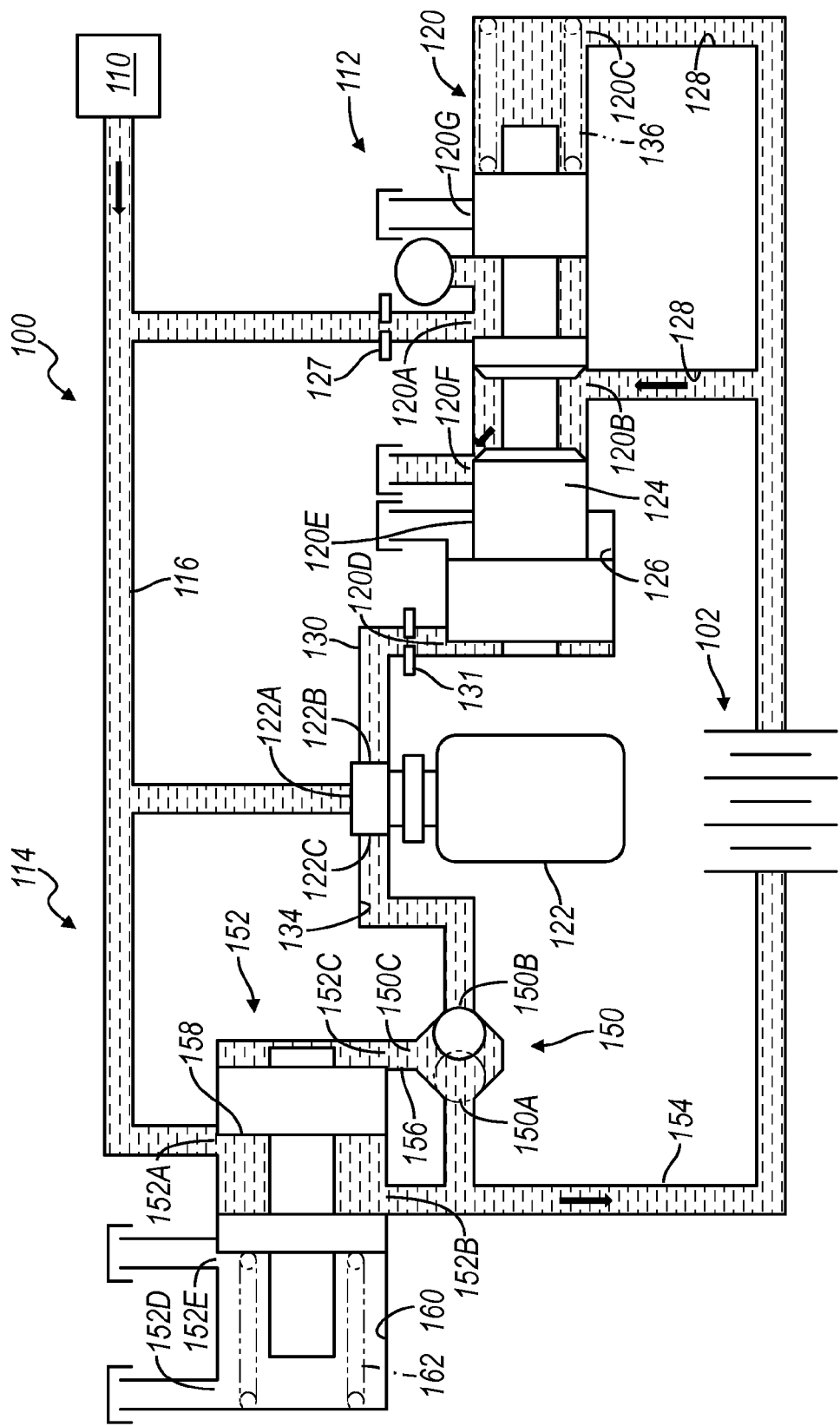
FIG. 2B is a diagram of the hydraulic control system of FIG. 2A in a second mode of operation.

Turning to FIGS. 2A and 2B, a portion of the hydraulic control system 100 is illustrated in more detail. The hydraulic control system 100 includes a line pressure control subsystem 110, a shift actuator subsystem 112, and a compensator subsystem 114. It should be appreciated that the hydraulic control system 100 may include various other subsystems that perform various functions within the transmission 14, such as a torque converter clutch (TCC) subsystem, a cooling subsystem, a lubrication subsystem etc., without departing from the scope of the present invention. The line pressure control subsystem 110 is connected to the pump 106 and includes pressure regulator valves, solenoids, and other components operable to control the pressure of the hydraulic fluid from the pump 106. Hydraulic fluid from the pump 106 is communicated at a line pressure from the line pressure control subsystem 110 to the shift actuator subsystem 112 and the compensator subsystem 114 via a main supply line 116.

The shift actuator subsystem 112 includes at least one clutch regulation valve assembly 120 and at least one control device 122 in communication with the main supply line 116. The clutch regulation valve 120 is operable to control the actuation of the torque transmitting device 24 by selectively communicating pressurized hydraulic fluid from the line pressure control subsystem 110 to the shift actuating device 102. The control device 122 is operable, in part, to control the actuation of the clutch regulation valve 120. It should be appreciated that the shift actuator subsystem 112 may have additional clutch regulation valves and control devices for controlling additional torque transmitting devices within the transmission 14 without departing from the scope of the present invention.

The clutch regulation valve 120 includes a spool valve 124 slidably disposed in a bore 126. The clutch regulation valve 120 includes an inlet port 120A, an outlet port 120B, a feedback port 120C, a control port 120D, and a plurality of exhaust ports 120E, 120F, and 120G. It should be appreciated that the clutch regulation valve 120 may have various other ports and configurations without departing from the scope of the present invention. The inlet port 120A is in fluid communication with the main supply line 116 via a fluid restriction orifice 127. The outlet port 120B and the feedback port 120C are in fluid communication with a clutch feed line 128. The clutch feed line 128 is in fluid communication with the shift actuating device 102. The control port 120D is in fluid communication with a first control line 130 via a fluid restriction orifice 131. The exhaust ports 120E, 120F, and 120G are in communication with the sump 104.

The first control line 130 communicates with the control device 122. The control device 122 is preferably a three-port solenoid that includes an inlet port 122A in communication with the main supply line 116 and a first outlet port 122B in communication with the control line 130 and a second outlet port 122C that communicates with a fluid line 134. The solenoid 122 is energized by the controller 26 to either open to allow fluid communication between the inlet port 122A and the outlet ports 122B, 122C or to close to prevent fluid communication between the inlet port 122A and the outlet ports 122B, 122C. Preferably, the ports 122B and 122C are a single outlet port on the solenoid that branches into two separate circuits. The solenoid 122 is preferably a variable bleed solenoid. However, it should be appreciated that other types of solenoids, including two-port solenoids, and other control devices may be employed without departing from the scope of the present disclosure.

The valve 124 is moveable between various positions including a de-stroked or first position, shown in FIG. 2B, and a stroked or second position, shown in FIG. 2A. The valve 124 is moved to the de-stroked position by a biasing member or spring 136 located at an end of the valve 124 when the control device 122 is in the closed state. When the valve 124 is in the de-stroked position, the inlet port 120A is isolated from the outlet port 120B. The valve 124 is moved to the stroked position when the control device 122 is in an open state and pressurized hydraulic fluid is communicated to the control port 120D to exert a force on an end of the valve 124 opposite the biasing member 136 that is sufficient to overcome the force exerted on the valve 124 by the biasing member 136. When the valve 124 is in the second position, the inlet port 120A is in fluid communication with the outlet port 120B. As the hydraulic fluid from the inlet port 120A enters the clutch feed line 128, a portion of the hydraulic fluid feeds back into the clutch regulation valve 120 via the feedback port 120C. The hydraulic fluid from the feedback port 120C contacts the valve 124 and exerts a force on the valve 124 with the biasing member 136 to move the valve to a regulating or balanced position. This feedback force is proportional to the amount of hydraulic fluid communicated from the inlet port 120A to the outlet port 120B. As the valve 124 moves back towards the de-stroked position, the valve 124 partially closes the inlet port 120A to the outlet port 120B, thereby reducing the pressure of the hydraulic fluid within the clutch feed line 128 and therefore the feedback force exerted on the valve 124 from the feedback port 120C. Eventually, a balance of forces on the valve 124 due to the control device 122, the biasing member 136, and the feedback pressure is achieved, thereby providing constant pressure regulation of the hydraulic fluid within the clutch feed line 128.

The compensator subsystem 114 includes a ball check valve assembly 150 and at least one clutch feed valve assembly 152 in communication with the main supply line 116. The ball check valve 150 is disposed between the clutch feed valve 152 and the control device 122. The ball check valve 150 includes three ports 150A-C. Port 150A communicates with a compensator feed line 154. Port 150B communicates with the fluid line 134. Port 150C communicates with a fluid line 156. The ball check valve 150 closes off whichever of the ports 150A and 150B that is delivering the lower hydraulic pressure and provides communication between whichever of the ports 150A and 150B having or delivering the higher hydraulic pressure and the outlet port 150C.

The compensator feed valve 152 is operable to aid in the release or disengagement of the torque transmitting device 24 by selectively communicating pressurized hydraulic fluid from the line pressure control subsystem 110 to the shift actuating device 102. The control device 122 is multiplexed with the compensator feed valve 152 to control the actuation of the compensator feed valve 152. It should be appreciated that the compensator subsystem 114 may have additional compensator feed valves for controlling additional torque transmitting devices within the transmission 14 without departing from the scope of the present invention.

The compensator feed valve 152 includes a spool valve 158 slidably disposed in a bore 160. The compensator feed valve 152 includes an inlet port 152A, an outlet port 152B, a control port 152C, and a plurality of exhaust ports 152D and 152E. It should be appreciated that the compensator feed valve 152 may have various other ports and configurations without departing from the scope of the present invention. The inlet port 152A is in fluid communication with the main supply line 116. The outlet port 152B is fluid communication with the compensator feed line 154. The compensator feed line 154 is in fluid communication with the shift actuating device 102. The control port 152C is in fluid communication with the fluid line 156. The exhaust ports 152D and 152E are in communication with the sump 104.

The valve 158 is moveable between at least two positions including a de-stroked or first position, shown in FIG. 2B, and a stroked or second position, shown in FIG. 2A. The valve 158 is moved to the de-stroked position by a biasing member or spring 162 located at an end of the valve 158 when the control device 122 is in the closed state. When the valve 158 is in the de-stroked position, the inlet port 152A is in communication with the outlet port 152B. The valve 158 is moved to the stroked position when the control device 122 is in an open state and pressurized hydraulic fluid is communicated to the control port 152C to exert a force on an end of the valve 158 opposite the biasing member 162 that is sufficient to overcome the force exerted on the valve 158 by the biasing member 162. When the valve 158 is in the stroked position, the inlet port 152A is isolated from the outlet port 152B and the outlet port 152B exhausts.

In order to selectively actuate the torque transmitting device 24, the solenoid 122 is commanded by the transmission controller 26 to the open state. Hydraulic fluid at line pressure is communicated through the main supply line 116 to the solenoid 122. The solenoid 122 communicates the hydraulic fluid to both the clutch regulation valve 120 and the compensator feed valve 152. The clutch regulation valve 120 is stroked and moved to the regulation position shown in FIG. 2A. Accordingly, hydraulic fluid is communicated at line pressure from the main supply line 116, through the clutch regulation valve 120, and communicated to the clutch feed line 128 at regulated pressure. The hydraulic fluid at regulated pressure then engages the shift actuating device 102, thereby actuating the torque transmitting device 24. Simultaneously, the hydraulic fluid from the outlet port 122C of the solenoid 122 communicates into the ball check valve 150. Port 150A is closed, and the hydraulic fluid communicates from port 150B to port 150C. The hydraulic fluid from port 150C communicates via fluid line 156 to the control port 152C and enters the compensator feed valve 152, thereby stroking the compensator feed valve 152. Accordingly, hydraulic fluid from the main supply line 116 is isolated from the compensator feed line 154. Accordingly, the compensator subsystem 114 is overridden when the torque transmitting device 24 is commanded to be engaged.

In order to release or disengage the torque transmitting device 24, the solenoid 122 is commanded by the transmission controller 26 to the closed state. The biasing member 136 de-strokes the clutch regulation valve 120 and the biasing member 162 de-strokes the compensator feed valve 152. Accordingly, hydraulic fluid is prevented from communicating from the main supply line 116 to the clutch feed line 128 by the clutch regulation valve 120 while hydraulic fluid from the main supply line 116 is allowed to communicate to the compensator feed line 154 through the compensator feed valve 152. The hydraulic fluid within the compensator feed line 154 communicates with the ball check valve 150 and closes port 150B. Accordingly, feedback pressure from the compensator supply line 154 enters port 150C and regulates the position of the valve 158, thereby regulating the pressure of the hydraulic fluid within the compensator supply line. Hydraulic fluid within the compensator feed line 154 also communicates with the shift actuating device 102 and aids in releasing the torque transmitting device 24 and balances the centrifugal effects of any rotating fluid trapped in the clutch feed line 128.

Figure 3A:
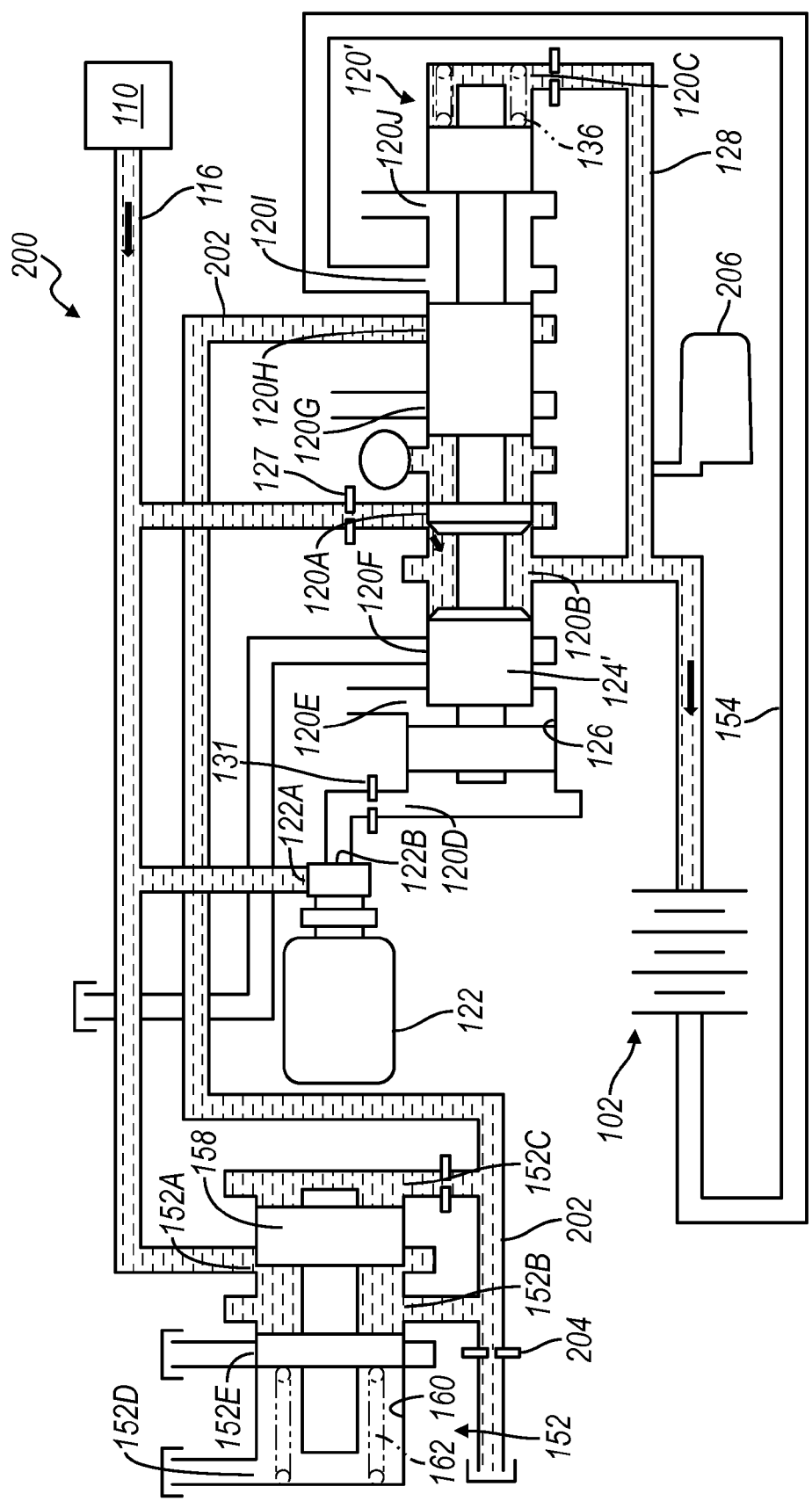
FIG. 3A is a diagram of another example of a hydraulic control system according to the principles of the present disclosure in first mode of operation.
Figure 3B:
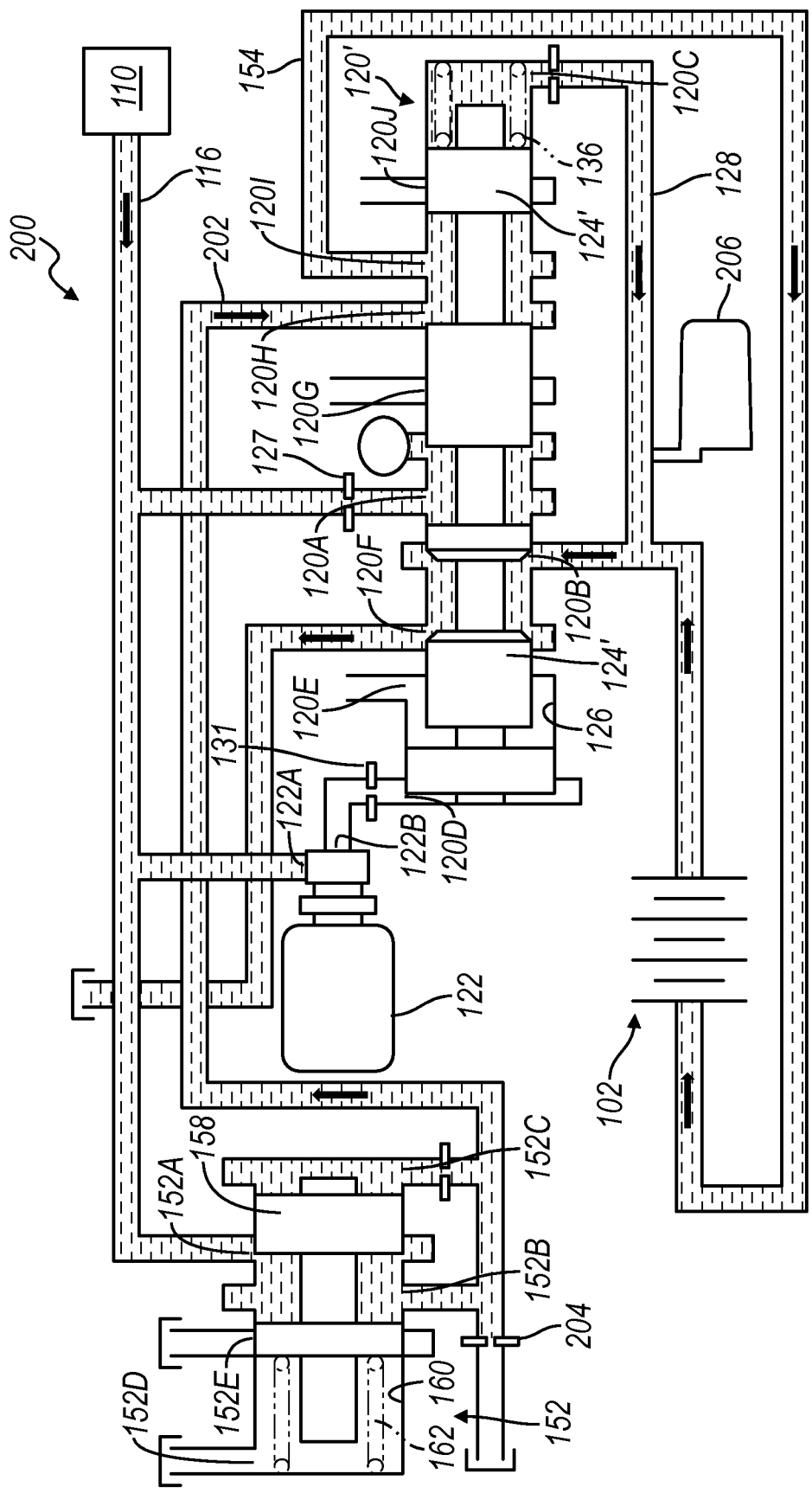
FIG. 3B is a diagram of the hydraulic control system of FIG. 3A in second mode of operation.

Turning to FIGS. 3A and 3B, an alternate hydraulic control system is generally indicated by reference number 200. The hydraulic control system 200 is similar to the hydraulic control system 100 shown in FIGS. 2A and 2B and like components are indicated by like reference numbers. However, in the hydraulic control system 200, the solenoid 122 is no longer multiplexed to the compensator feed valve 152 and the ball check valve 150 has been removed. Instead, the outlet port 152B and control port 152C of the compensator feed valve 152 communicate with a compensator supply line 202. The compensator supply line 202 communicates via a flow restriction orifice 204 with the sump 104 via a low pressure exhaust circuit and with a modified clutch regulation valve 120'. The clutch regulation valve 120' includes additional ports 120H, 120I, and 120J and a modified spool valve 124'. Port 120H is in fluid communication with the compensator supply line 202. Port 120I is in fluid communication with the compensator feed line 154. Port 120J is an exhaust port in fluid communication with the sump 104.

The valve 124' is moveable between various positions including a de-stroked or first position, shown in FIG. 3B, and a stroked or second position, shown in FIG. 3A. The valve 124' is moved to the de-stroked position by the biasing member or spring 136 located at an end of the valve 124' when the control device 122 is in the closed state. When the valve 124' is in the de-stroked position, the inlet port 120A is isolated from the outlet port 120B and the outlet port 120B is in fluid communication with the exhaust port 120F. In addition, port 120H is in fluid communication with port 120I, thereby linking the compensator supply line 202 with the compensator feed line 154. The valve 124' is moved to the stroked position when the control device 122 is in an open state and pressurized hydraulic fluid is communicated to the control port 120D to exert a force on an end of the valve 124' opposite the biasing member 136 that is sufficient to overcome the force exerted on the valve 124' by the biasing member 136. When the valve 124' is in the second position, the inlet port 120A is in fluid communication with the outlet port 120B. In addition, port 120H is isolated and port 120I is in fluid communication with exhaust port 120J. As the hydraulic fluid from the inlet port 120A enters the clutch feed line 128, a portion of the hydraulic fluid feeds back into the clutch regulation valve 120 via the feedback port 120C. The hydraulic fluid from the feedback port 120C contacts the valve 124' and exerts a force on the valve 124' with the biasing member 136 to move the valve 124' to a regulating or balanced position. This feedback force is proportional to the amount of hydraulic fluid communicated from the inlet port 120A to the outlet port 120B. As the valve 124' moves back towards the de-stroked position, the valve 124' partially closes the inlet port 120A to the outlet port 120B, thereby reducing the pressure of the hydraulic fluid within the clutch feed line 128 and therefore the feedback force exerted on the valve 124' from the feedback port 120C. Eventually, a balance of forces on the valve 124' due to the control device 122, the biasing member 136, and the feedback pressure is achieved, thereby providing constant pressure regulation of the hydraulic fluid within the clutch feed line 128.

The clutch feed line 128 communicates with an accumulator 206. The accumulator 206 is an energy storage device in which the non-compressible hydraulic fluid is held under pressure by an external source. In the example provided, the accumulator 206 is a spring type or gas filled type accumulator having a spring or compressible gas that provides a compressive force on the hydraulic fluid within the accumulator 206. However, it should be appreciated that the hydraulic accumulator 206 may be of other types without departing from the scope of the present invention. The accumulator 206 is operable to help engage the torque transmitting device 24 by supplying hydraulic fluid to the shift actuating device 102 during engine restart or stop events.

In order to selectively actuate the torque transmitting device 24, the solenoid 122 is commanded by the transmission controller 26 to the open state. Hydraulic fluid at line pressure is communicated through the main supply line 116 to the solenoid 122. The solenoid 122 communicates the hydraulic fluid to the clutch regulation valve 120'. The valve 124' of the clutch regulation valve 120' is stroked and moved to the regulation positions shown in FIG. 3A. Accordingly, hydraulic fluid is communicated at line pressure from the main supply line 116, through the clutch regulation valve 120', and communicated to the clutch feed line 128 at regulated pressure. The hydraulic fluid at regulated pressure then engages the shift actuating device 102, thereby actuating the torque transmitting device 24. Simultaneously, the compensator feed valve 152 is de-stroked by the biasing member 162. The hydraulic fluid from the main supply line 116 communicates through the compensator feed valve 152 to the compensator supply line 202. However, the valve 124' of the clutch regulation valve 120' isolates the compensator supply line 202 from the compensator feed line 154, and the hydraulic fluid within the compensator feed line 154 exhausts. Therefore, the compensator subsystem 114 is overridden by the clutch regulation valve 120' when the torque transmitting device 24 is commanded to be engaged.

In order to release or disengage the torque transmitting device 24, the solenoid 122 is commanded by the transmission controller 26 to the closed state. The biasing member 136 de-strokes the clutch regulation valve 120' and the biasing member 162 keeps the compensator feed valve 152 de-stroked. Hydraulic fluid is prevented from communicating from the main supply line 116 to the clutch feed line 128 by the clutch regulation valve 120' while hydraulic fluid from the main supply line 116 is allowed to communicate to the compensator supply line 202 through the compensator feed valve 152. The hydraulic fluid within the compensator supply line 202 communicates to port 120H to port 120I and into the compensator feed line 154. The hydraulic fluid within the compensator feed line 154 communicates the shift actuating device 102 and aids in releasing the torque transmitting device 24 and balances the centrifugal effects of any rotating fluid trapped in the clutch feed line 128.

It should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The description of the invention is merely exemplary in nature and variations that do not depart from the gist of the invention are intended to be within the scope of the invention. Such variations are not to be regarded as a departure from the spirit and scope of the invention.

We claim the following:
1. A hydraulic control system in a transmission, the transmission having a torque transmitting device, the hydraulic control system comprising:
 a source of pressurized hydraulic fluid for providing a pressurized hydraulic fluid;
 a first valve in communication with the source of pressurized hydraulic fluid and in communication with a release side of the torque transmitting device, the first valve operable to allow communication of the hydraulic fluid from the source of pressurized hydraulic fluid to the torque transmitting device to release the torque transmitting device;

a second valve in communication with the source of pressurized hydraulic fluid and in communication with an apply side of the torque transmitting device, the second valve moveable between at least a first position and a second position, wherein the second valve prevents the hydraulic fluid from communicating with the torque transmitting device when in the first position and wherein the second valve allows the hydraulic fluid to communicate with the torque transmitting device to engage the torque transmitting device when in the second position; and an override feature operably associated with at least one of the first valve and the second valve, wherein the override feature is operable to prevent the first valve from communicating the hydraulic fluid to the torque transmitting device when the second valve is in the second position.

2. The hydraulic control system of claim 1 wherein the first valve is moveable between at least a first position and a second position, wherein the first valve allows the hydraulic fluid to communicate with the torque transmitting device to disengage the torque transmitting device when in the first position and wherein the first valve prevents the hydraulic fluid from communicating with the torque transmitting device when in the second position, and wherein the override feature includes a control device for controlling a position of the first valve and the second valve, wherein when the control device is in a first state the first valve is in the first position and the second valve is in the first position, and when the control device is in a second state the first valve is in the second position and the second valve is in the second position.

3. The hydraulic control system of claim 2 wherein the control device is a three-port variable bleed solenoid.

4. The hydraulic control system of claim 1 wherein the first valve is in communication with the torque transmitting device via the second valve, wherein the second valve allows the hydraulic fluid from the first valve to communicate with the torque transmitting device when in the first position and wherein the second valve prevents the hydraulic fluid from the first valve from communicating with the torque transmitting device when in the second position, and wherein the override feature includes a control device for controlling a position of the second valve, wherein when the control device is in a first state the second valve is in the first position and when the control device is in a second state the second valve is in the second position.

5. The hydraulic control system of claim 4 wherein the control device is a two-port variable bleed solenoid.

6. The hydraulic control system of claim 1 wherein the override feature is operable to prevent the first valve from communicating the hydraulic fluid to the release side of the torque transmitting device.

7. A hydraulic control system in a transmission, the transmission having a torque transmitting device, the hydraulic control system comprising:

a source of pressurized hydraulic fluid for providing a pressurized hydraulic fluid;

a compensator valve assembly having an inlet port in communication with the source of pressurized hydraulic fluid and an outlet port in communication with the torque transmitting device, the compensator valve assembly having a compensator valve moveable between at least a first position and a second position, wherein the compensator valve allows fluid communication between the inlet port and the outlet port when in the first position and wherein the compensator valve prevents fluid communication between the inlet port and the outlet port when in the second position;

a regulation valve assembly having an inlet port in communication with the source of pressurized hydraulic fluid and an outlet port in communication with the torque transmitting device, the regulation valve assembly having a regulation valve moveable between at least a first position and a second position, wherein the regulation valve prevents fluid communication between the inlet port and the outlet port when in the first position and wherein the regulation valve allows fluid communication between the inlet port and the outlet port when in the second position; and a control device operatively associated with the compensator valve assembly and the regulation valve assembly, wherein the control device includes a first state of operation where the compensator valve is in the first position and the regulation valve is in the first position and a second state of operation where the compensator valve is in the second position and the regulation valve is in the second position, and wherein the torque transmitting device is disengaged when the control device is in the first state of operation, and wherein the torque transmitting device is engaged when the control device is in the second state of operation.

8. The hydraulic control system of claim 7 wherein the control device is a three-port variable bleed solenoid in fluid communication with the source of pressurized hydraulic fluid, the compensator valve, and the regulation valve, and wherein the first state of operation prevents fluid communication between the source of pressurized hydraulic fluid and the compensator valve and the regulation valve, and the second state of operation allows fluid communication between the source of pressurized hydraulic fluid and the compensator valve and the regulation valve.

9. The hydraulic control system of claim 8 wherein the compensator valve is biased to the first position by a first biasing member and the regulation valve is biased to the first position by a second biasing member.

10. The hydraulic control system of claim 7 wherein the compensator valve assembly further includes a feedback port in fluid communication with an end of the compensator valve opposite the first biasing member.

11. The hydraulic control system of claim 10 further comprising a three-way ball check valve having a first port in fluid communication with the outlet port of the compensator valve assembly, a second port in fluid communication with the control device, and a third port in fluid communication with the feedback port of the compensator valve assembly, wherein the second port is closed to the first and third ports when the control device is in the first state and wherein the first port is closed to the second and third ports when the control device is in the second state.

12. The hydraulic control system of claim 7 wherein the compensator valve assembly is in communication with a release side of the torque transmitting device the regulation valve assembly is in communication with an apply side of the torque transmitting device.

13. The hydraulic control system of claim 12 wherein the override feature is operable to prevent the first valve from communicating the hydraulic fluid to the release side of the torque transmitting device.

14. A hydraulic control system in a transmission, the transmission having a torque transmitting device having an apply side and a release side, the hydraulic control system comprising:
- a source of pressurized hydraulic fluid for providing a pressurized hydraulic fluid;
- a compensator valve assembly having an inlet port in communication with the source of pressurized hydraulic fluid and an outlet port, wherein the compensator valve assembly is operable to regulate a pressure of the hydraulic fluid at the outlet port;
- a regulation valve assembly having a first inlet port in communication with the source of pressurized hydraulic fluid, a second inlet port in communication with the outlet port of the compensator valve assembly, a first outlet port in communication with the apply side of the torque transmitting device, and a second outlet port in communication with the release side of the torque transmitting device, the regulation valve assembly having a regulation valve moveable between at least a first position and a second position, wherein the regulation valve prevents fluid communication between the first inlet port and the first outlet port and allows fluid communication between the second inlet port and the second outlet port when in the first position and wherein the regulation valve allows fluid communication between the first inlet port and the first outlet port and prevents fluid communication between the second inlet port and the second outlet port when in the second position; and
- a control device operatively associated with the regulation valve assembly, wherein the control device includes a first state of operation where the regulation valve is in the first position and a second state of operation where the regulation valve is in the second position, and
- wherein the torque transmitting device is disengaged when the control device is in the first state of operation, and wherein the torque transmitting device is engaged when the control device is in the second state of operation.

15. The hydraulic control system of claim 14 wherein the control device is a two-port variable bleed solenoid in fluid communication with the source of pressurized hydraulic fluid and the regulation valve, and wherein the first state of operation prevents fluid communication between the source of pressurized hydraulic fluid and the regulation valve, and the second state of operation allows fluid communication between the source of pressurized hydraulic fluid and the regulation valve.

16. The hydraulic control system of claim 14 wherein the regulation valve is biased to the first position by a biasing member.

17. The hydraulic control system of claim 16 wherein the regulation valve assembly further includes a feedback port in fluid communication with the first outlet port and with an end of the compensator valve opposite the first biasing member.

* * * * *